(12) United States Patent
Murotani et al.

(10) Patent No.: US 6,959,360 B2
(45) Date of Patent: Oct. 25, 2005

(54) DATA STORAGE SYSTEM AND METHOD OF HIERARCHICAL CONTROL THEREOF

(75) Inventors: Akira Murotani, Tokyo (JP); Toshio Nakano, Tokyo (JP); Akinobu Shimada, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 10/898,488

(22) Filed: Jul. 23, 2004

(65) Prior Publication Data

US 2004/0260875 A1   Dec. 23, 2004

Related U.S. Application Data

(63) Continuation of application No. 09/792,377, filed on Feb. 23, 2001, now Pat. No. 6,779,078.

(30) Foreign Application Priority Data

May 24, 2000 (JP) .............................. 2000-157962

(51) Int. Cl.[7] .............................................. G06F 00/12
(52) U.S. Cl. ........................ 711/114; 711/112; 711/165
(58) Field of Search ............................ 711/4, 111, 112, 711/114, 154, 156, 161, 162, 165, 158

(56) References Cited

U.S. PATENT DOCUMENTS

| | | | | |
|---|---|---|---|---|
| 5,742,792 A | * | 4/1998 | Yanai et al. ................. | 711/162 |
| RE36,989 E | * | 12/2000 | White ......................... | 711/118 |
| 6,189,071 B1 | * | 2/2001 | Bachmat ..................... | 711/114 |
| 6,275,898 B1 | * | 8/2001 | DeKoning .................. | 711/114 |
| 6,314,503 B1 | * | 11/2001 | D'Ericco et al. ........... | 711/165 |
| 6,571,310 B1 | * | 5/2003 | Ottesen et al. .................. | 711/5 |

* cited by examiner

*Primary Examiner*—B. James Peikari
*Assistant Examiner*—Woo H. Choi
(74) *Attorney, Agent, or Firm*—Townsend and Townsend and Crew LLP

(57) ABSTRACT

A method of selecting logical volumes that are the targets for data migration to equilibrate the load on a system, based on the accessing data of the physical drives and logical drives under the disk array controllers, without increasing the load of the disk array controller. An external manager communicates with two or more disk array controllers, gathers and manages the access data and the configuration data relating to the physical drives and logical volumes of each disk array controller, and prepares an optimum data migration instruction to equilibrate the access load.

12 Claims, 6 Drawing Sheets

FIG.6

Example of selecting procedure of migration object logical volume — 53

Example of fuzzy user input of disk array use conditions

| Time | Object items | Fuzzy priority level |
|---|---|---|
| Entire day | DB response: speed up of specific drive | High speed is desired |
| End of month | DB response: month-end processing | Highest priority |
| Daytime | Batch JOB | Run time is to be limited |
| Nighttime | Full backup | Can be stopped |

Example of output of the performance function of disk array use conditions

| Object performance series | Priority time zone | Priority level |
|---|---|---|
| Batch JOB | Complete within 8 hours from 6 p.m. | 100% |
| DB response | Not given with priority | 0% |

List the bottleneck logical volumes — 54
(logical volume activity rate of performance series being given priority in priority in priority time zone)

| Performance series | Activity rate of logical volume | |
|---|---|---|
| Batch job | Logical volume 47: 90% | Logical volume 50: 60% |

Accessing pattern is sequential: threshold value is 35%

Decision of executing data transferring migration to applications shown in FIG.4 — 55

When data transferring migration is possible and effective;
- ● Prepare migration instruction
  - Migration origin logical volume (example: logical volume 47)
  - Migration destination logical volume (example: logical volume 49)
  - Executing disk array controller (example: disk array controller 40)
- ● Setting up of migration object flag
  (example: set to 1)

Decision of all applications are completed?
- Yes → (proceed)
- No → Assign next high priority application as decision object

Issue migration trigger — 56
- User designate time
- Time zone of low access activity migration origin logical volume

DATA STORAGE SYSTEM AND METHOD OF HIERARCHICAL CONTROL THEREOF

CROSS-REFERENCE TO RELATED APPLICATION

The present invention is continuation of U.S. application Ser. No. 09/792,377, filed Feb. 23, 2001 now U.S. Pat. No. 6,779,078, and is herein fully incorporated by reference for all purposes.

BACKGROUND OF THE INVENTION

The present invention relates to data storage units, and especially to data migration, and, in particular, to a method and a storage unit to control hierarchical management of data migration to maintain balanced performance.

In a conventional hierarchical control system, such as disclosed in JP-A-9-44381, a controller executes migration of frequently accessed data to a storage unit having a high access speed and transfers infrequently accessed data to a storage unit having a low access speed, based on access frequency of data managed inside the controller.

SUMMARY OF THE INVENTION

In a typical storage area network (SAN) system, a plurality of applications in one or more host units share volume groups, and the volume groups to which the applications on the host units execute input and output extend over two or more controllers. Conventional hierarchical control system assigns volumes to a high-speed storage pool in a hierarchical sequence of reference values that reflect how frequently the volumes have been accessed, based on the activity rate of the volumes in a unit of controllers. The higher the reference value the higher the access activity.

Therefore, if a volume has a higher reference value than that of a volume for a specific application under the same controller, transfer of the higher reference value volume precedes transfer of the application volume. As a result, there may be times when a performance bottleneck of a specific application cannot be resolved. That is, sometimes data migrations that do not contribute to improved performance are executed, whereas data migrations that would contribute to improved performance are not executed.

In addition, because the controllers cannot share information about the data migration priorities assigned, data migration of a volume accessed by a specific application cannot be preceded. A conventional hierarchical control system assigns volumes to a high-speed storage pool in descending order of their reference values, which are based on the number of times the volumes have been accessed over a specified period.

Some applications show quite different accessing patterns depending on timing requirements. However, the difficulty of discriminating between volumes having a continual high activity rate and volumes causing a large performance bottleneck because of accessing concentrated at a specific time, but which have a low activity rate over a long period, results in inefficiency in executing transfer of the volumes in the absence of data migration. This problem can be avoided by acquiring and storing access data at very short intervals; however, data acquisition at very short intervals in a disk array controller increases the controller load, disturbing the load equilibrium and impairing the performance of the total system.

Software has been developed for acquiring volume information at short intervals without increasing the total system load. The software stores and displays such access data as activity rates of the volumes communicating with the controller. However, this software, by itself, cannot acquire the corresponding structures of logical volumes and physical drives, the activity rates of the physical drives, volume performance limitations depending on accessing modes, etc., all of which are necessary for hierarchical management control. Nor can the software automatically instruct the controller about migration. Consequently, the software cannot plan data migration to precisely equilibrate the load to the total system.

One objective of the present invention is to provide a more efficient system to execute data migration and a method thereof, when volumes of the same application extend over two or more controllers. Another objective is to provide a system for executing migration of a volume of a specific application having priority and a method thereof, when the volumes of the same application extend over two or more controllers. Yet another objective of the present invention is to provide a system for acquiring volume information over short intervals without increasing the load on the total system, and for automatically instructing the controller to execute migration and a method thereof.

A storage system configured to extend over two or more controllers is provided with a means (external manager, etc.) having the functions of gathering, compiling and managing the activity rate of each physical drive constituting logical volumes, the activity rate of the logical volumes, the access patterns, the performance information and the configuration information of the correlation between the physical drives and the logical volumes. The external manager generates a data migration instruction by using the accumulated information.

BRIEF DESCRIPTION OF THE DRAWINGS

FIG. 6 is a flow chart illustrating a processing sequence on the external manager for describing performance function.

DESCRIPTION OF THE SPECIFIC EMBODIMENTS

Figure 1:
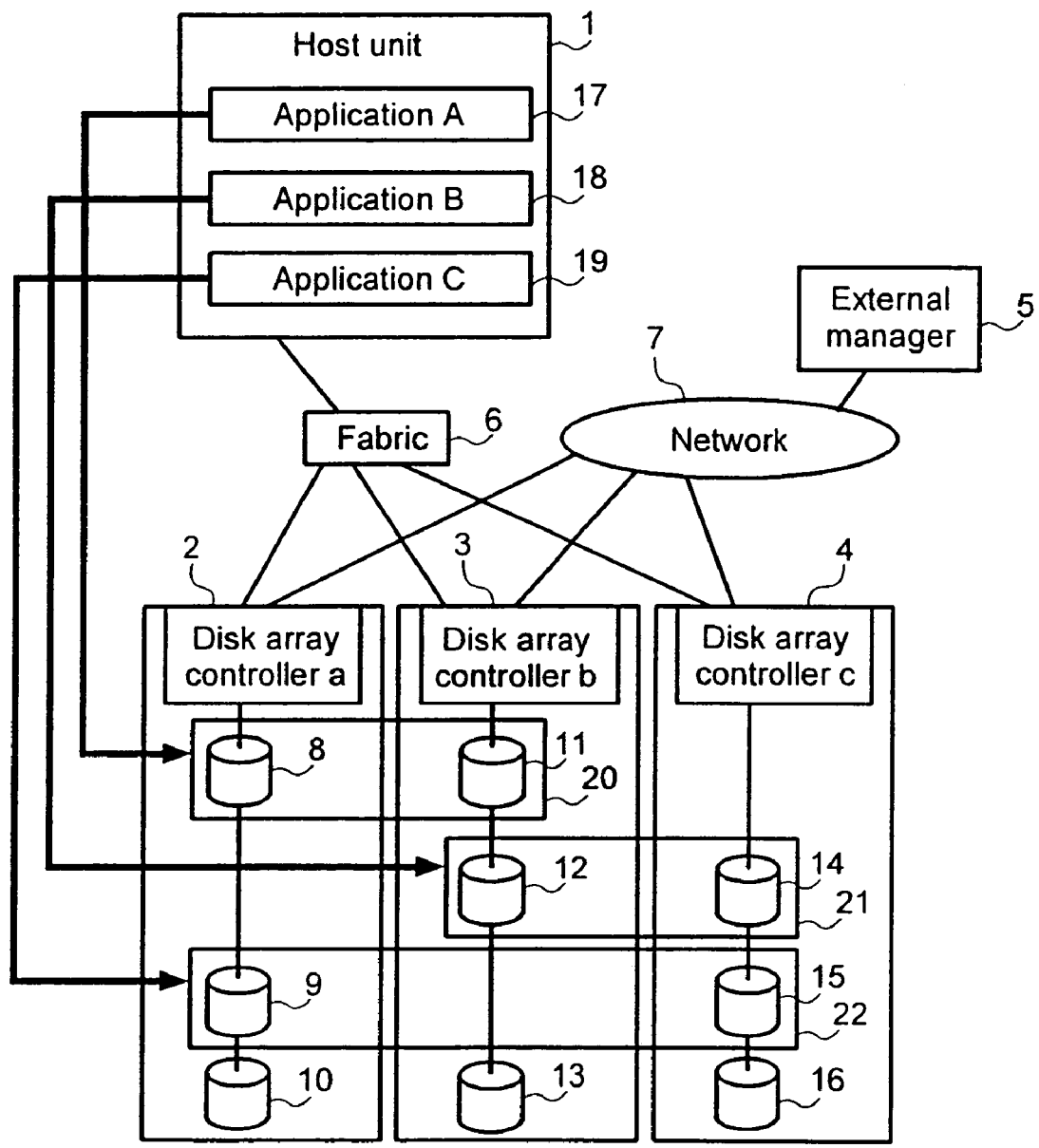
FIG. 1 is a block diagram illustrating a configuration of a preferred embodiment of the present invention.

A system configuration comprising a host unit, two or more disk array controllers, and an external manager is illustrated in FIG. 1, with an example of performance tuning effected by the migration of a portion of logical volume data to a high speed storage pool when a host unit is accessing the logical volumes of two or more disk array units.

A host unit 1 executing two or more applications and disk array controllers 2, 3 and 4 are connected by a Fabric Switch 6 through a Fibre Channel. Controllers 2, 3 and 4 are connected to external manager 5 which gathers accessing state (in the preferred embodiment, access data about the number of read/write commands for each application during a predetermined period such as 24 hours) through a network 7. External manager 5 obtains access data by compiling access data managed by each of the controllers. External manager 5 can be remotely located from controllers 2, 3 and 4, i.e., where a system administrator is stationed, or built into the same cabinet as the controllers. Disk array controller 2 controls logical volumes 8, 9 and 10, while controller 3 controls logical volumes 11, 12 and 13 and controller 4 controls logical volumes 14, 15 and 16.

Amid the processing of host unit 1, application A 17 accesses a logical volume group 20 comprising logical volumes 8 and 11, which have a RAID level 5 structure, application B 18 accesses logical volume group 21 comprising logical volumes 12 and 14 which also have a RAID level 5 structure, and application C 19 accesses logical volume group 22 comprising the logical volumes 9 and 15.

Each of the logical volumes 8, 9, 10, 11, 12, 13, 14, 15 and 16 comprises two or more physical disks and the capacity of each logical volume is the same. Each of the logical volumes 10, 13 and 16 is a high speed storage pool having a RAID level 1 structure and is not accessed by the host unit 1.

An external manager 5 retains corresponding information about applications 17 to 19 on host unit 1, on the logical volumes that are the access targets of the applications, and on disk array controllers 2 to 4, which control the logical volumes. An example of the retention method is shown in table form in number 23 of FIG. 2. In the example, logical volume 8 accessed by the application A 17 is retained with the added code "a-1", which means the first logical volume of disk array controller 2 specified by an ID of "a."

The corresponding information is acquired by user inputs to the external manager, but can also be obtained from communications between the host unit and the external manager, or from Switch Fabric and communications between the management console of the Fabric and the external manager, or the information can be acquired automatically.

Figure 3:
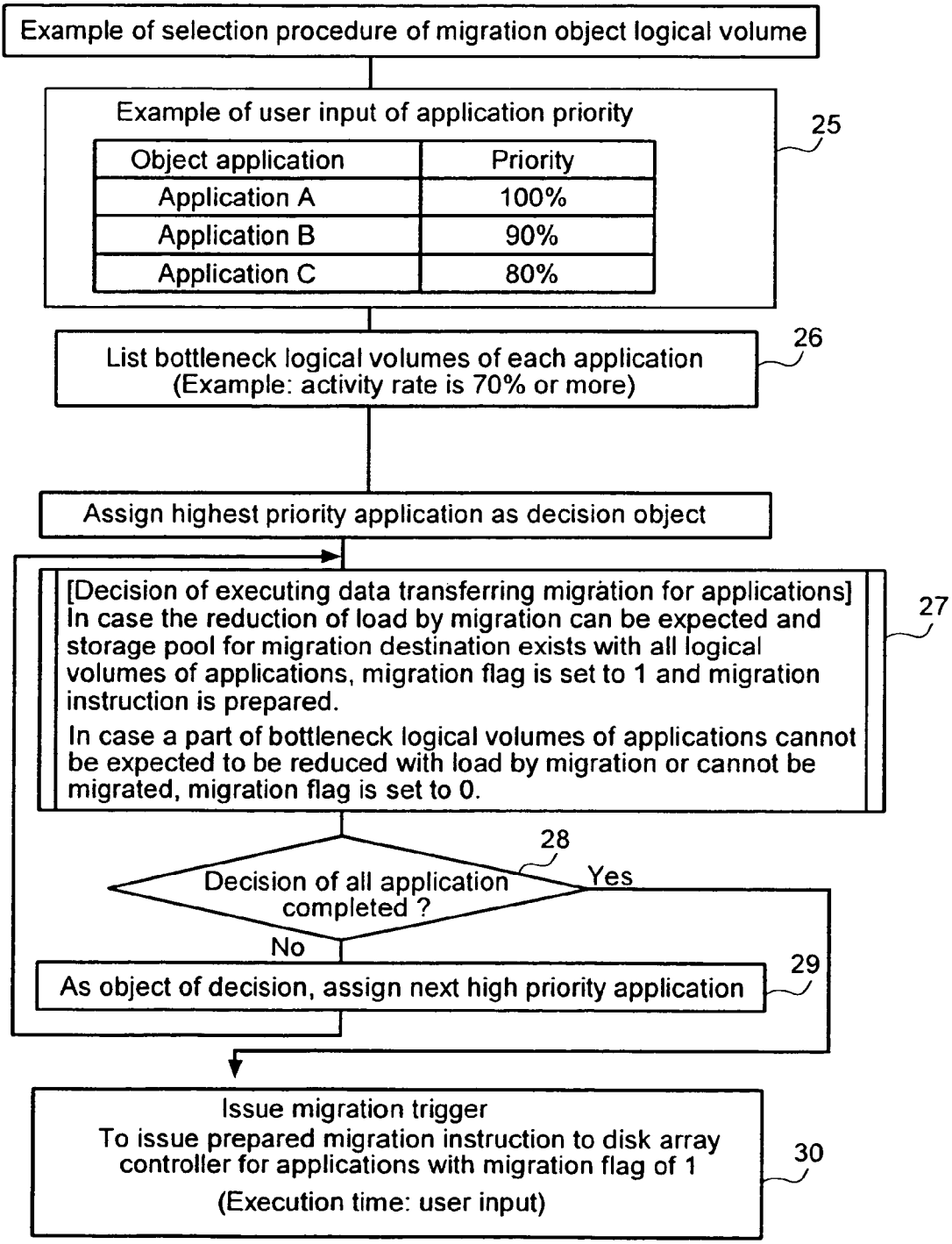
FIG. 3 is a flow chart illustrating a processing sequence by which the external manager selects a target logical volume.

Referring to FIG. 3, the procedure by which the external manager selects a migration target logical volume is explained.

In step 25, a user assigns to the external manager an application whose performance can be improved by data migration and assigns a priority percentage to the application. In FIG. 3, the priority is assigned to application A 17 is 100%; to application B 18, 90%; and to application C 19, 70%.

Figure 2:
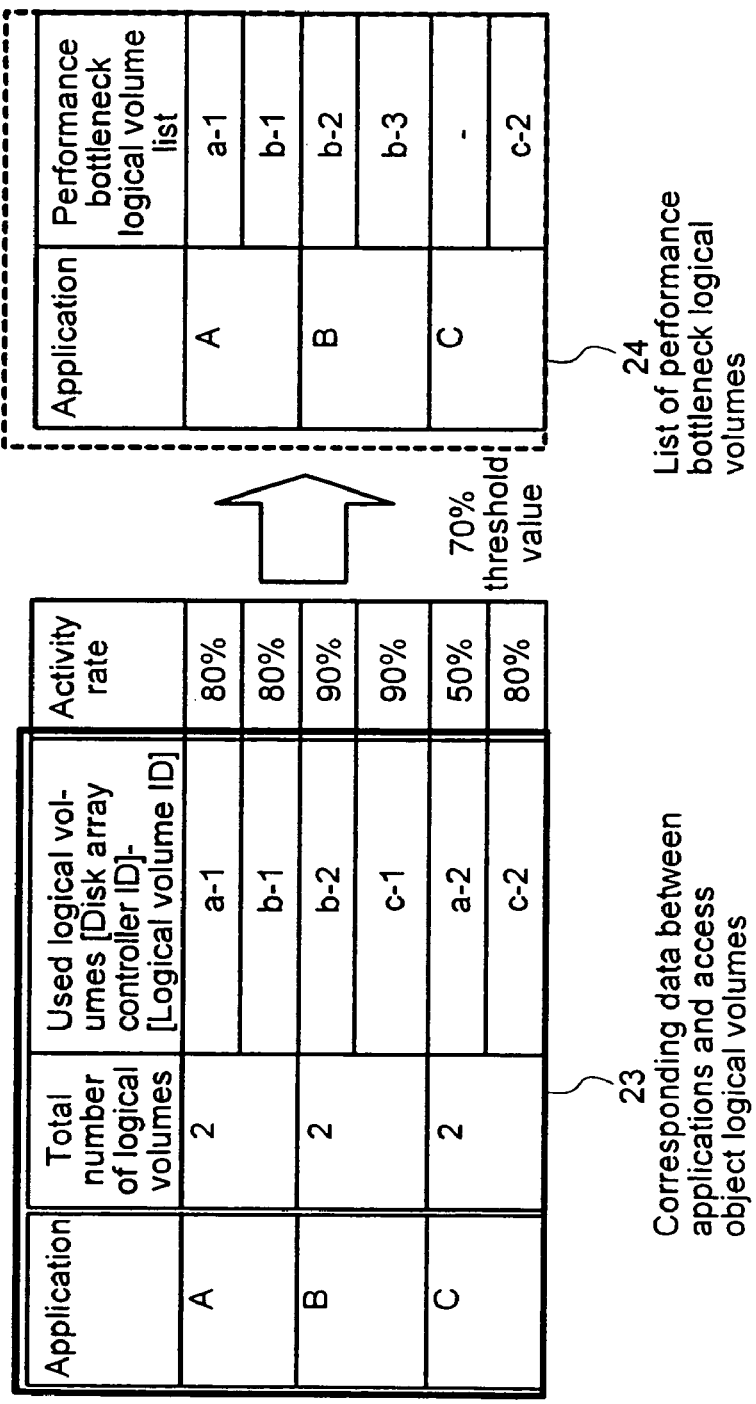
FIG. 2 is a table illustrating an example of holding I/O information on an external manager, as required by the preferred embodiment of the present invention.

In step 26, the external manager sorts the activity rates of the logical volumes in regard to the access target volumes retained as corresponding information (see 23 in FIG. 2) and specifies one or more logical volumes considered to be bottlenecked owing to a high activity rate. In FIG. 2, the logical volumes for which activity rates exceed the threshold value of 70% are specified as the performance bottlenecks and the information is retained in the list shown in 24 of FIG. 2.

In processing steps 27 to 29, the external manager works out a decision index for executing data migration for each high priority application, in sequence. The execution decision shown in step 27 is worked out by analysis of the logical volume which is the performance bottleneck shown in FIG. 4.

Figure 4:
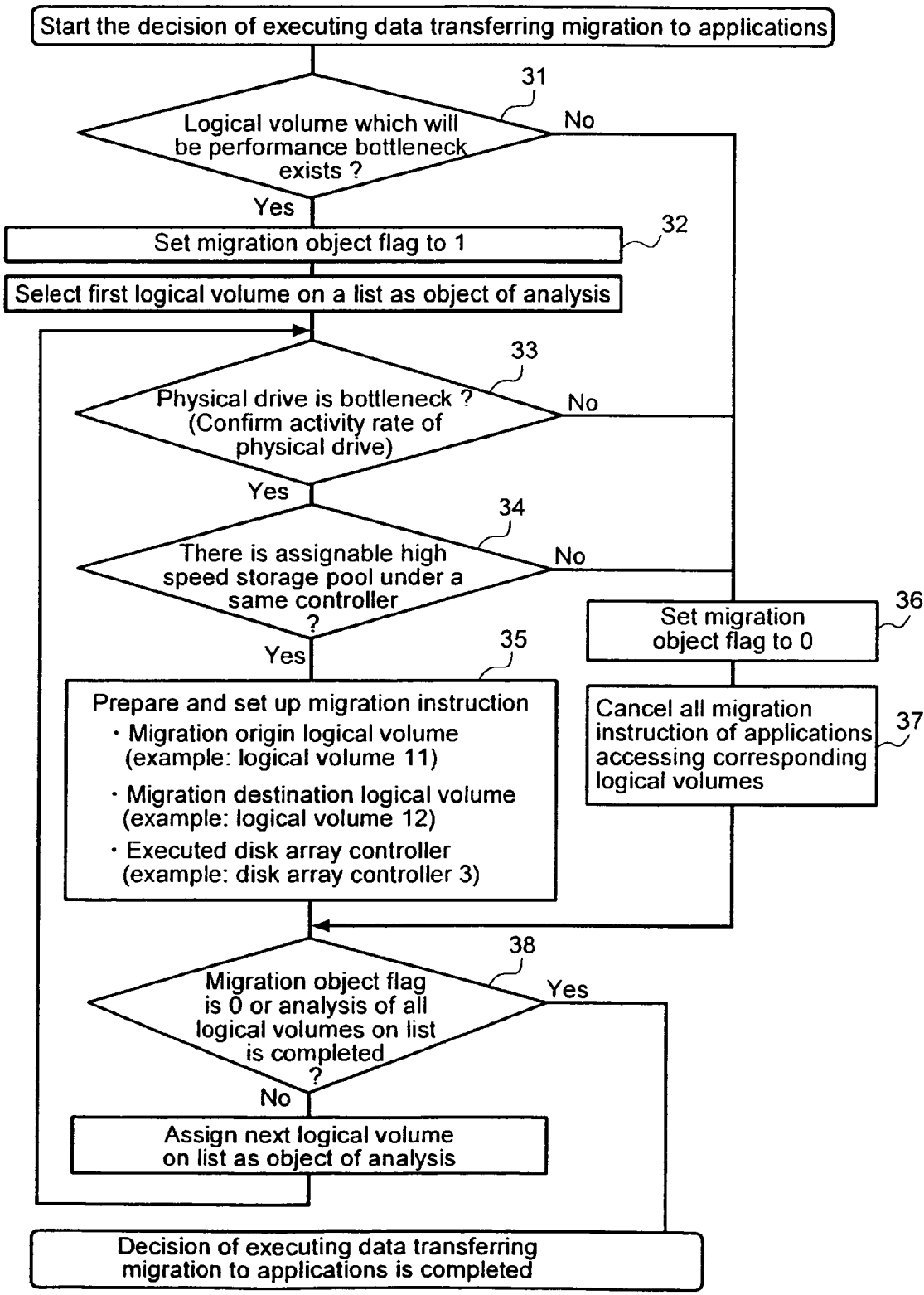
FIG. 4 is a flow chart illustrating the decision process for executing data migration of each application.

In step 31 of FIG. 4, external manger 5, at first, refers to the list of the logical volumes that are the performance bottlenecks of each application selected at the step 26 of FIG. 3 and sets a migration target flag (which is the decision index of step 27 of FIG. 3) to 1 at step 32 if there is at least one logical volume in the list. Then, at step 33, external manager 5 confirms that the bottleneck is caused by the physical drive and that the load can be equilibrated by the data migration of each logical volume registered in the bottleneck logical volume list for each application. At step 34, external manager 5 confirms there is a resource in the high speed storage pool to serve as the destination of the data migration and that it has not been assigned as the destination of a data migration of another high-priority application; then external manager 5 prepares the data migration instruction. As shown in step 38, the external manager completes the analysis of the logical volumes of the application after executing analytical processing steps 32 to 35 for all logical volumes on the list.

If the logical volumes with the performance bottlenecks cannot be specified at step 31, or the load on any logical volume on the list cannot be equilibrated by data migration at steps 32 and 33, the external manager, at step 36, sets the migration target flag (which is the decision index at step 27 of FIG. 3) to "0," releases the high-speed storage pool assigned to the application at step 37, and completes the analysis of the logical volumes of the application. Finally, at step 28 of FIG. 3, external manager 5 issues the data migration instruction prepared at step 35 of FIG. 4 as a migration trigger for the application, wherein the migration target flag is set to "1" at the user-designated time.

In the example of FIG. 2, since application A 17 has the highest priority, logical volume 8 indicated as "a-1" and logical volume 11 indicated as "b-1" are selected by the analysis process shown in FIG. 4. The high-speed storage pool 10 is assigned to logical volume 8, and high-speed storage pool 13 is assigned to logical volume 11.

For application B 18, logical volume 12 indicated as "b-2" and logical volume 14 indicated as "c-1" are the targets of the data migration. However, since disk array controller 3, which controls the logical volume 12, does not have a high-speed storage pool, application B 18 does not execute data migration.

In contrast to a conventional hierarchical control system selecting logical volumes 12 and 14, which application B accessed as the performance bottleneck volumes based on the activity rate of the volumes managed by each of the disk array controllers, the system of the present invention selects logical volumes 11 and 13, which contain the performance bottleneck of application A 17, which has the priority of performance improvement. Therefore, an efficient data migration that will match the user input can be planned.

According to the system of the present invention, since the data migration of application B 18 is not executed, the high-speed storage pool of controller 4 has a redundancy. Therefore, the data migration can be executed to logical volume 15 indicated as "c-2", which is the performance bottleneck logical volume of application C 19, and a more efficient migration can be executed.

The operation of disk array controller 2 which receives the migration trigger is now described with reference to FIG. 1. By assigning logical volume 13 as the mirror volume of logical volume 11, disk array controller 3 copies the data of logical volume 11 to logical volume 13 while executing access of host unit 1 to logical volume 11. As the copy is completed, and host unit 1 continues to access logical volumes 11 and 13 inside controller 3, controller 3 releases the mirror volume described above. Simultaneously, host unit 1 moves the access destination logical volumes and access destination Link information comprising accompanying management information from logical volume 11 to logical volume 13. Therefore, since the access destination Link information of host unit 1 is taken over by logical volume 13, data migration can be executed without interrupting host unit 1 in executing the access, and with the volume ID of logical volume 11 taken over by logical volume 13, host unit 1 is not required to change the access destination logical volume before and after the migration. Thus, the system of the present invention can realize transparent migration. More effective data migration for improving performance can be planned by using time series data on external manager 5 to select the migration target logical volumes.

External manager 5 collects short- and long-interval access data that serves as the index for migration. For example, activity rates are collected every 10 minutes for one year on all physical drives and all logical volumes. A system acquiring access data at short intervals (e.g., every 10 minutes) can easily identify occurrences of both individual and numerous accesses, that can impair performance, and, unlike a system that acquires data over long periods (e.g., every 24 hours), has the advantage of being able to rule out as migration candidates logical volumes with higher average loads that do not cause performance bottlenecks. However, a system acquiring access data over long intervals can facilitate migration planning consistent with volume load variations by shifting migration times and by identifying gradual increases in routine processing times.

In a conventional hierarchical management system that acquires access data for short or long periods, the disk array controller load is high and affects the accessing performance of the hardware. Conversely, in the system of the present invention, the disk array controller load is not high.

Figure 5:
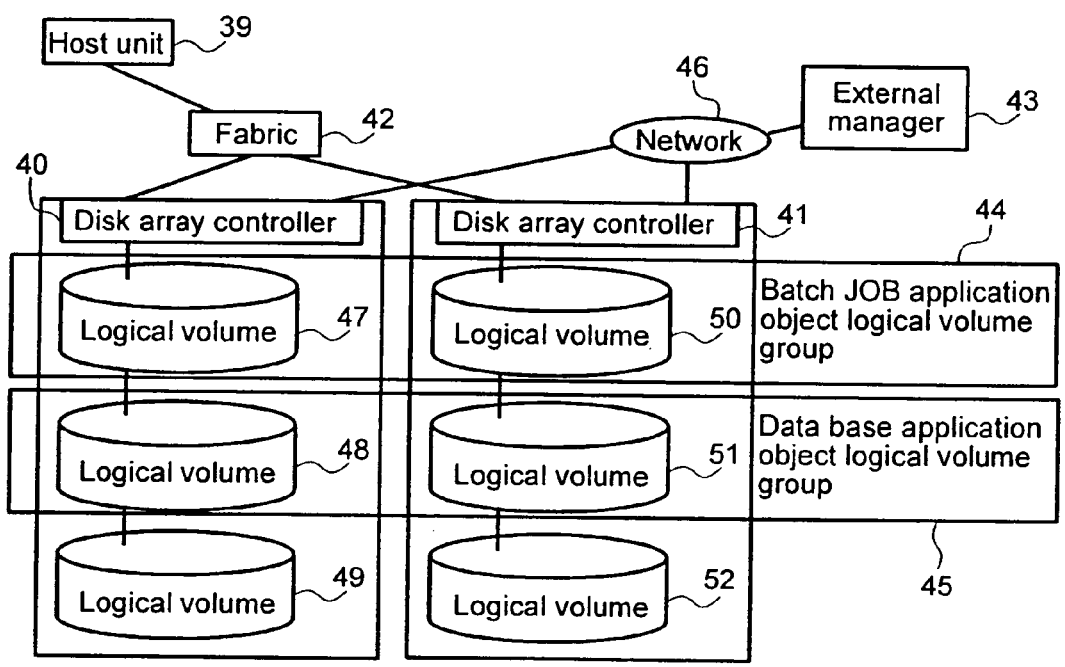
FIG. 5 is a block diagram illustrating the system configuration for using time series data to select the logical volume that is the target of data migration.

FIGS. 5 and 6 are examples of the process followed by external manager 43 to select the target logical volumes for data migration using time series data. In the preferred embodiment of the present invention, access data mainly indicates the number of read/write commands for each application within a predetermined period shorter than those of the previous examples. The specific predetermined time will be given later.

In FIG. 5, a host unit 39 executing a plurality of processing programs and disc array controllers 40, 41 is connected to the controllers by Fabric Switch 42 through a Fibre Channel, and controllers 40, 41 are connected to external manager 43 to collect access data through network 46.

Controller 40 controls logical volumes 47, 48 and 49, and controller 41 controls logical volumes 50, 51 and 52. Host unit 39 executes the access of a batch JOB application to logical volume group 44 comprising the logical volumes 47 and 50, which have a RAID level 5 structure (mirroring and parity) and executes the access of a database application to logical volume group 45 comprising the logical volumes 48 and 51, which also have a RAID level 5 structure.

Each of the logical volumes 49 and 52 is a high speed storage pool having a RAID level 1 structure (mirroring only) and is not accessed from host unit 39. Each of the logical volumes 47, 48, 49, 50, 51 and 52 comprises two or more physical disks and has the same capacity as the logical volume. External manager 43 holds information about the applications on the host unit and the logical volume groups that are the access targets of the applications. Further, external manager 43 collects, over short and long periods, the access data that serves as the index of migration.

At step 53 of FIG. 6, a user inputs to external manager 5 a fuzzy priority for each application, for the performance series of the applications and for the run time of the applications. The external manager selects one or more of the performance series and applications that are migration targets, based on performance function, and assigns them priority levels. In the example of FIG. 6, the external manager assigns a priority of 100% to the batch JOB that runs from 18:00 to 2:00.

At step 54, external manager 43 specifies the logical volume having a high activity rate and considered to be the bottleneck, by sorting both the activity rates of the logical volumes that are the analysis targets and the accumulated data such as the random characteristic of access addresses. In the example of FIG. 6, which uses the batch JOB selected at the step 53 as the target application, and the estimated activity rate threshold level is 85%, the performance series is sequential, and the access target of the batch job application is logical volume group 44. Logical volume 47 exceeds the threshold level for target volumes of group 44, so it is specified as the performance bottleneck volume.

Generally, since the deflection of the access load occurs between logical volumes 47 and 50 of logical volume group 44, the load can be equilibrated among the logical volumes and the access speed to group 44 can be improved by migrating bottlenecked logical volume 47 to the high-speed storage pool of controller 40.

At step 55, external manager 43 executes the sequence shown in FIG. 4 listing the bottlenecked logical volumes specified at step 54, decides whether to execute the data migration to the batch JOB, sets the migration target flag, and prepares the migration instruction.

In the example of FIG. 6, since the batch JOB is the highest priority application and logical volume 49 in the high speed storage pool can be assigned as the migration destination for bottlenecked logical volume 47, the migration target flag for the batch JOB is set to "1".

At step 56, the external manager, which executed the decision of the data transferring migration to all applications at the step 55, issues the migration instruction prepared at step 55 as the migration trigger for applications with the migration target flag of "1." The time for generating the trigger can either be a user-defined time or one selected from a time zone showing low access activity to the corresponding volume, based on the time analysis of step 53. Controller 40, which receives the trigger and executes the data migration from logical volume 47 to logical volume 49, can effect access load equilibration in logical volume group 44 by reducing the load to logical volume 47, thereby improving performance.

A more convenient system for users that directs and executes data migration can be provided if the access state is determined based not only on time zone information as described above, but also on additional factors which determine the usage state of the recording medium, such as comparison of the frequency of sequential or the random accesses.

According to the present invention, in a system, typically a Storage Area Network, in which two or more host units share two or more disk array units and an external manager connected to each disk array unit gathers access data from the host units about the physical drives and the logical volumes inside the disk array unit, performance tuning by reassignment of the logical volumes can be provided without increasing the load on the disk array controller because the external manager selects the reassignment target logical volume groups and the reassignment destination logical volume groups and directs migration to the disk array controllers by assigning a fuzzy performance series and time zone where increased host unit access speed is expected.

The preceding has been a description of the preferred embodiment of the invention. It will be appreciated that deviations and modifications can be made without departing from the scope of the invention, which is defined by the appended claims.

What is claimed is:

1. A data storage system that is accessed by one or more applications executing on a host system that is connected to a communication network, the data storage system comprising:
   a first storage subsystem having a first disk controller configured to connect to the communication network and operative to service read and write commands relating to I/O requests from the host;
   at least a second storage subsystem having a second disk controller configured to connect to the communication network and operative to service read and write commands relating to I/O requests from the host; and
   a storage manager in data communication with the first storage subsystem and with the second storage subsystem and operative to:
      obtain input/output (I/O) activity information of volumes in the first storage subsystem;
      obtain input/output (I/O) activity information of volumes in the second storage subsystem;
      obtain volume information for a first application which is executing on the host system that identifies volumes in the first storage subsystem and in the second storage subsystem that are accessed by the first application;
      selectively initiate a first transfer of data from a selected volume in the first storage subsystem that is associated with the first application to a target volume in the first storage subsystem, based on I/O activity of the selected volume and on whether or not there is a free volume in the first storage system that can serve as the target volume; and
      selectively initiate a second transfer of data from a selected volume in the second storage subsystem that is associated with the first application to a target volume in the second storage subsystem, based on I/O activity of the selected volume and on whether or not there is a free volume in the second storage system that can serve as the target volume,
      wherein if one of the first or second transfers of data cannot be initiated, then the other transfer of data will not be initiated.

2. The data storage system of claim 1, wherein the storage manager is in data communication with the first and second storage subsystems over a second communication network.

3. The data storage system of claim 1, wherein the first and second disk controllers each includes a performance monitor to monitor I/O performance of volumes in its respective storage subsystem.

4. The data storage system of claim 1, wherein the first storage subsystem comprises a plurality of first physical storage units, wherein volumes in the first storage subsystem are logical volumes comprising the first physical storage units, wherein the second storage subsystem comprises a plurality of second physical storage units, wherein volumes in the second storage subsystem are logical volumes comprising the second physical storage units.

5. The data storage system of claim 4, wherein the free volume in the first storage subsystem comprises some of the first physical storage units, wherein the free volume in the second storage subsystem comprises some of the second physical storage units.

6. The data storage system of claim 1, wherein the volumes in the first storage subsystem that are associated with the first application and the volumes in the second storage subsystem that are associated with the first application constitute a logical volume group.

7. The data storage system of claim 6 wherein the logical volume group is defined according to a RAID 5 structure.

8. A data migration method comprising:
   servicing I/O requests made by a first application executing on a host system, including communicating I/O commands to either or both a first data system and a second data system;
   monitoring I/O activity of volumes in the first data system;
   monitoring I/O activity of volumes in the second data system;
   obtaining volume information associated with the first application, the volume information indicative of a first volume in the first data system that is accessed to service the I/O requests made by the first application and a second volume in the second data system that is accessed to service the I/O requests made by the first application;
   selectively initiating a first copy operation to copy the first volume to a target volume in the first data system, the target volume being obtained from a storage pool in the first data system; and
   selectively initiating a second copy operation to copy the second volume to a target volume in the second data system, the target volume being obtained from a storage pool in the second data system,
   wherein the first copy operation is indicated if the I/O activity of the first volume exceeds a first predetermined value,
   wherein the second copy operation is indicated if the I/O activity of the second volume exceeds a second predetermined value,
   wherein the first and second copy operations are initiated if the first and second copy operations are indicated and if a target volume is available in the first data system and a target volume is available in the second data system,
   wherein the first and second copy operations are not initiated if the first and second copy operations are indicated and if a target volume is not available in either or both the first data system and the second data system.

9. The method of claim 8, wherein each of the steps of monitoring includes communicating information relating to the I/O activity to a storage management system.

10. The method of claim 9, wherein the storage management system performs the initiating steps.

11. The method of claim 10, wherein the steps of monitoring are performed by the storage systems, wherein information relating to the I/O activity is communicated to a storage management system that is separate from the storage systems.

12. A data storage system comprising:
   a first storage system having first volumes, some of which constitute a first pool;
   a second storage system having second volumes, some of which constitute a second pool;

a plurality of logical volume groups, each logical volume group comprising a combination of one or more first volumes and one or more second volumes;

a first monitor operative to produce first activity information relating to I/O activity of the first volumes;

a second monitor operative to produce second activity information relating to I/O activity of the second volumes; and a storage manager operative to receive the first and second activity information, wherein if I/O activity of first volumes that comprise a first logical volume group exceeds a first predetermined threshold and I/O activity of second volumes that comprise the first logical volume group exceeds a second predetermined threshold, and:

if the first pool has available volumes and the second pool has available volumes, then the storage manager is further operative to perform a data copy operation, and if either the first pool does not have available storage or the second pool does not have available storage, then the data copy operation is not performed, the data copy operation being an operation in which data in the first volumes that comprise the first logical volume group is copied to first volumes selected from the first pool and data in the second volumes that comprise the first logical volume group is coped to second volumes selected from the second pool.

* * * * *